United States Patent

[11] 3,607,822

| [72] | Inventor | Kenichi Nishino<br>Takatsuki-shi, Japan |
|---|---|---|
| [21] | Appl. No. | 714,005 |
| [22] | Filed | Mar. 18, 1968 |
| [45] | Patented | Sept. 21, 1971 |
| [73] | Assignee | Takeda Chemical Industries, Ltd.<br>Higashi-ku, Osaka-shi, Japan |
| [32] | Priority | Mar. 23, 1967 |
| [33] | | Japan |
| [31] | | 42/18137 |

[54] THIXOTROPICAL POLYURETHANE COMPOSITIONS
7 Claims, No Drawings

[52] U.S. Cl. .................................................. 260/37,
260/77.5, 260/858
[51] Int. Cl. .................................................. C08g 51/04,
C08g 51/14
[50] Field of Search .......................................... 260/77.5,
858, 37 N

[56] References Cited
UNITED STATES PATENTS
3,441,523 4/1969 Dwyer et al.................. 260/2.5

*Primary Examiner*—Morris Liebman
*Assistant Examiner*—Richard Zaitlen
*Attorney*—Stephens, Heuttig and O'Connell ABSTRACT: A thixotropical polyurethane composition comprising 100 weight parts of a polyurethane prepolymer, 0.1 to 50 weight parts of colloidal silica of an average particle size of 3 to 50 μ 0.001 to 50 weight parts of at least one ethylene glycol polymer, having an average molecular weight of 100 to 20,000, of the group consisting of polyethylene glycol, polyethylene glycol ether and polyethylene glycol ester; the weight ratio of said ethylene glycol polymer to said colloidal silica being in the range of between 0.05:1 and 0.5:1.

THIXOTROPICAL POLYURETHANE COMPOSITIONS

This invention relates to thixotropical polyurethane compositions, and more particularly to compositions containing polyurethane prepolymers and specific additives capable of imparting thixotropical property to the prepolymers.

Polyurethanes are excellent in physical properties, particularly in elasticity, weathering property and abrasion resistance and have been utilized in various fields, such as elastomers, coating materials for papers or fibers, paints, sealants, flooring materials, walling materials, adhesives, synthetic leathers and the like. For such purposes there have been generally used pasty or liquid compositions of polyurethane prepolymers having no thixotropy but fluidity. Therefore, when such compositions are applied as a paint or sealant to a vertical surface, for example, they do not allow easy brushing or spatula work, giving uneven coatings due to running thereof, and further when they are applied as an adhesive or coating material to a porous paper or fiber, for example, difficult coating operation is required due to considerable penetration thereof.

Accordingly, it is important problem in the art to impart thixotropy to the polyurethane compositions, but there has been proposed no successful method adapted for the purpose yet.

One object of the invention is to provide chemicals capable of imparting thixotropy to polyurethane compositions. Another object of the invention is to provide polyurethane compositions having excellent thixotropy. Further object of the invention is to provide thixotropical polyurethane compositions which can be easily applied to a vertical surface or a porous material free from undesirable running or penetration.

The above and other objects of the invention will be apparent from the following descriptions.

These objects of the invention can be accomplished by a thixotropical polyurethane composition comprising 100 weight parts of a polyurethane prepolymer, 0.1 to 50 weight parts of colloidal silica of an average particle size of 3 to 50 m$\mu$ and 0.001 to 50 weight parts of at least one ethylene glycol polymer, having an average molecular weight of 100 to 20,000, of the group consisting of polyethylene glycol, polyethylene glycol ether and polyethylene glycol ester; the weight ratio of said ethylene glycol polymer to said colloidal silica being in the range of between 0.05:1 and 0.5:1.

According to the researches of the present invention it has now been found that when said colloidal silica and polyethylene glycol or ether or ester thereof is added in combination with the polyurethane prepolymer in the specific range and ratio as above mentioned, a markedly excellent thixotropy is imparted to the prepolymer and a polyurethane composition having thixotropy can be obtained, while individual use of the colloidal silica and ethylene glycol polymer can not impart thixotropy to the prepolymer.

The polyurethane prepolymer used in the invention is liquid, pasty or solid at a room temperature, and the preferably prepolymer is liquid or pasty one having a 500 to 10,000 molecular weight. Such prepolymers are known in the art and prepared by the conventional methods, such as, by the well-known reaction of polyisocyanates with active hydrogen atom-containing compounds. Desirable molar ratio of NCO to H is usually in the range of between 1.1:1 and 5.0:1, particularly between 1.5:1 and 3.0:1. Examples of the polyisocyanates are 2,4-tolylenediisocyanate, 2,6-tolylenediisocyanate, m-phenylenediisocyanate, p-phenylenediisocyanate, 1-chlorophenylene-2,4-diisocyanate, 1,5-naphthalenediisocyanate, 3,3'-bistoluene-4,4'-diisocyanate, methylene bisphernylene-4,4'-diisocyanate, tetramethylenediisocyanate, hexamethylenediisocyanate, "Papi" (trade mark, polyisocyanate of Cabot Corporation, U.S.A.) and dimers and trimers of these isocyanates and triisocyanates obtained by reacting triols such as trimethylolpropane and 3 times mole of diisocyanates, etc.

As active hydrogen atom—containing compounds there may be preferably used those containing 2 to 5 active hydrogen atoms in the molecule thereof and having a molecular weight of 60 to 8,000. Examples are (1) Low molecular weight diols or triols, such as ethyleneglycol, propyleneglycol, 1,4-butanediol, hexamethyleneglycol, 1,4-cyclohexanediol, triisopropanolamine, trimethylolpropane, glycelol, etc.; (2) Polyalkyleneglycols, such as polypropyleneglycol, polytetramethyleneglycol ethyleneoxidepropyleneoxide copolymers, etc., (3) Copolymers of alkyleneoxides (e.g. ethyleneoxide, propylenoxide, etc.) with low molecular weigh polyols (e.g. glycerine, trimethylpropane, 1,2,6-hexanetriol, erythritol, pentaerythritol, etc.); (4) Polyesterpolyols from polyols and polycarboxylic acids, such as reaction products of ethyleneglycol, propyleneglycol, 1,4- or 1,3-butandiol, 1,6-hexanediol and the like polyols with adipic acid, succinic acid, maleic acid, phthalic acid, terephthalic acid and the like polycarboxylic acids; (5) Ring-opening polymers of cyclic esters, such as polycaprolactone, polybutylolactone, etc.; (6) Esters of polyols and higher aliphatic acids, such as mono- or diricinolate of mono-, di- or triethylene glycol, mono-, di- or triricinolate of 1,2,6-hexanetriol or trimethylolpropane, mono-, di-, tri- or tetraricinolate of pentaerythritol or erythritol, castor oil, hydrogenated castor oil, mono- or diglyceride of castor oil acid or hydrogenated castor oil acid, etc., and (7) Polyamines, such as ethylenediamine, propylenediamine, tetramethylenediamine, p-phenylenediamine, 2,4-diaminotoluene, methylene-bis-4,4'-diaminobenzene, 4,4'-methylene-bis-o-chloroaniline, etc.

In the invention there may also be used blocked polyurethane prepolymers. The isocyanate blocking agents used are, for example, phenolic compounds such as phenol, thiophenol, chlorophenol, methyl thiophenol, ethyl phenol, ethyl thiophenol, nitrophenol, cresol, xylenol or resorcinol, alcohols such as ethanol, methanol, propanol, isopropanol, butanol, tert-butanol, tert-pentanol, tert-butanethiol or tert-hexanol or its derivatives such as ethylene chlorohydrine, $\omega$-hydroperfluoroalcohols or 1,3-dichlor-2-propanol, aromatic amines such as diphenylamine, diphenyl naphthyl amine or xylidine, imides such as succinic acid imide or phthalic acid imide, active methylene compounds such as acetoacetic acid esters, acetyl acetone or malonic acid diesters, mercaptans such as 2-mercapto benzothiazol or tert-dodecyl mercaptan, lactams such as $\epsilon$-caprolactum, $\delta$-valerolactam, $\Gamma$-butyrolactam or $\beta$-propyllactam, imines such as ethylene imine, urea compounds such as urea, thiourea or diethylene urea, oximes such as acetoxime, methylethyl-ketone oxime, or cyclohexanone oxime, diaryl compounds such as carbazole, phenyl naphthyl amine or N-phenyl xylidine, bisulfates and borates. Of these blocking agents phenolic compounds and ethanol are preferable.

In the invention said polyurethane prepolymer is used in the form of liquid prepolymer or organic solvent solution. The preferably viscosity of the liquid prepolymer or solution may be determined in accordance with the use of the final compositions, but usually those having a viscosity of 10 to 1,000,000 c.p.s., preferably 1,000 to 1,000,000 c.p.s., may be used. The viscosity is a value measured at 23°.C. under 4 r.p.m. by Brookfield Viscometer. As the solvent there may be used various organic solvents, for example, esters such as ethyl acetate, butyl acetate, amyl acetate, etc.; ketones such as acetone, methylethylketone, methylisobutylketone, etc.; aromatic hydrocarbons such as toluene, benzene, xylene, etc.; ethers such as tetrahydrofuran, dioxane, etc.; alkyl amides such as N,N'-dimethylformamide, N,N'-dimethylacetoamide, etc.; or dimethylsulfoxide.

The colloidal silica used in the invention has an average particle size of 3 to 50 m$\mu$, preferably 5 40 m$\mu$, and is available under the trade mark of "Aerosil" (Trade Mark; colloidal silica manufactured by Degussa, West Germany) and "Carbosil" (Trade Mark; colloidal silica manufactured by Cabot Corporation, U.S.A.). While it has been know that such colloidal silica is effective for imparting thixotropy to various synthetic resin prepolymers, individual use thereof is almost ineffective in the case of polyurethane prepolymers.

According to the present invention it is essential to use the colloidal silica in combination with ethylene glycol polymers in the specific amount and ratio, whereby the final composition shows excellent thixotropy.

The ethylene glycol polymers used in the invention include polyethylene glycol, polyethylene glycol ether and polyethylene glycol ester, having a molecular weight of 100 to 20,000. The preferably polyethylene glycol ether is aryl ether, such as diphenyl, dinaphthyl, diochlorophenyl and the like and alkyl ether of 1 to 18 carbon atoms, such as ethyl, isopropyl, stearyl and the like, and preferably ester is carboxylic acid ester of 2–18 carbon atoms, such as benzoate, acetate, laurate and the like.

The amounts of the colloidal silica and ethylene glycol polymers contained in the present composition are important, and the former should be contained in the range of 0.1 to 50 weight parts, preferably 0.5 to 20 weight parts, based on 100 weight parts of the polyurethane prepolymer and the latter in the range of 0.001 to 50 weight parts, preferably 0.05 to 10 weight parts, based on 100 weight parts of the polyurethane prepolymer. The weight ratio of the ethylene glycol polymers to the colloidal silica is also significant in the invention, and the ethylene glycol polymer should be contained in 0.05 to 0.5 times, preferably 0.1 to 0.3 times the weight of the colloidal silica. Namely, when the colloidal silica and ethylene glycol polymer are used in combination in the above range of amount and ratio, the resultant polyurethane composition can display excellent thixotropy due to synergetic effect of the both compounds. If one of the both compounds is used in less amount thixotropical composition can not be obtained. The use of larger amount results in gelation of the composition.

The polyurethane composition of the preset invention may further contain other additives, such as calcium carbonate, gypsum, talc, silica, clay, cement, magnesium carbonate, asbestos, glass wool and the like fillers, dioctyl phthalate, dibutyl phthalate, tricresil phosphite, tar and the like plasticizers, titan while, red iron oxide and the like pigments.

The composition of the invention can be used as not only one-can type composition but also two-can type composition.

For fuller understanding of the invention Examples are given below, in which all percentages and parts are shown by weight, and slump test was carried out in accordance with ASA (American Standard Association) A 116 1-1960.

EXAMPLE 1

To 1,000 parts of polypropylenediol of average molecular weight of 1,000 were added 278.4 parts of 2,4-trilenediisocyanate and 69.6 parts of 2,6-trilenediisocyanate, and the mixture was heated at 80° C. for 2 hours in nitrogen stream, whereby a colorless and transparent polyurethane prepolymer of amine equivalent of 720 was obtained. The molecular weight of the prepolymer was 1,440 and the viscosity was 17,500 c.p.s. at 23° C.

To 1,000 parts of the resultant prepolymer were added 60 parts of "Aerosil" (Trade Mark; colloidal silica of 5 to 40 mµ average particle size manufactured by Degussa, West Germany) and 5 parts of polyethylene glycol of average molecular weight of 3,000 and the mixture was kneaded at 80° C. by a vacuum kneader to produce a composition in the form of paste or grease.

The composition was subjected to the slump test and after 1 hour at 50° C. no slump was observed. The viscosity of the composition was measured at 23° C. by varying the rotation speed of Brookfield Viscometer with the following results:

Viscosities at 23° C. (c.p.s.)
| 2 r.p.m. | 4 r.p.m. | 10 r.p.m. | 20 r.p.m. |
|---|---|---|---|
| 298,000 | 188,000 | 134,000 | 72,000 |

For comparison a composition of 1,000 parts of said prepolymer and 300 parts of aerosil was prepared by the same manner as above and subjected to the same slump test, flowdown of more than 20 mm. being observed.

EXAMPLE 2

To a mixture of 2,400 parts of polypropylene glycol of average molecular weight of 2,000 and 300 parts of polypropylene triol of average molecular weight of 3,000 was added 252 parts of 2,4-tolylenediisocyanate and 63 parts of 2,6-tolylenediisocyanate, and the mixture was heated in nitrogen stream at 80° C. for 2 hours, whereby was obtained a colorless and transparent polyurethane prepolymer of amine equivalent of 3,500. The prepolymer showed a viscosity of 150,000 c.p.s. at 25° C. To 100 parts of the prepolymer were added 20 parts of dioctylphthalate, 33 parts of calcium carbonate, 3 parts of titanium oxide, 6 parts of "Aerosil" (Trade Mark, same as specified in Example 1) and 0.5 part of polyethylene glycol of average molecular weight of 6,000 and the mixture was kneaded in a vacuum kneader to produce white paste. By the slump test at 70° C. in the manner same as in Example 1, it resulted in zero mm. of slump.

EXAMPLE 3

To 600 parts of polybutylene adipate diol of average molecular weight of 2,400 was added 125 parts of 4,4'-methylenebisphenylisocyanate and the mixture was heated in nitrogen stream at 80° C. for 2 hours to produce amide equivalent of 1,427 of white waxy polyurethane prepolymer.

To 100 parts of the prepolymer were added 30 parts of N,N'-dimethylformamide, 5 parts of "Aerosil" (Trade Mark, same as specified in Example 1) and 0.2 part of polyethyleneglycol diphenylether of average molecular weight of 4,000 and the mixture was kneaded in a vacuum kneader, whereby a polyurethane composition having thixotropy was obtained.

The viscosity of the composition was measured at 23° C. by varying the rotation speed of Brookfield Viscometer to the following results:

Viscosities at 23° C. (c.p.s.)
| 2 r.p.m. | 4 r.p.m. | 10 r.p.m. | 20 r.p.m. |
|---|---|---|---|
| 2,350 | 1,750 | 1,010 | 780 |

EXAMPLE 4

100 parts of 75 weight percent ethyl acetate solution of a polyurethane prepolymer prepared from trimethylolpropane and 8:2 weight ratio mixture of 2,4-tolylenediisocyanate and 2,6-tolylenediisocyanate was mixed with 6 parts of "Aerosil" (Trade Mark, same as specified in Example 1), 0.5 part of polyethylene glycol of average molecular weight of 3,000 and 50 parts of thinner to obtain the composition of the invention. To the resultant composition was added "Desmophen 1100" (Trade Mark, polyesterpolyol of Farbenfabriken Bayer, West Germany) so as to obtain a molar ratio of NCO group and OH group = about 1.2:1, and further added thinner. A vertical surface of a steel plate was coated with the resultant paint and the painted surface was compared with that painted with the same composition except that "Aerosil" and polyethylene glycol were not added, to exhibit a neat finish while the latter showed marked uneven finish due to fluidity.

EXAMPLE 5

To 3,000 parts of polypropylene triol of 3,000 average molecular weight was added 522 parts of 8:2 weight ratio mixture of 2,4-tolylenediisocyanate and 2,6-tolylenediisocyanate and the mixture was heated in nitrogen stream at 80° C. for 4 hours, producing a colorless and transparent polyurethane prepolymer of 1,180 amine equivalent in the form of viscous liquid.

From the resultant liquid prepolymer the following four sample compositions were prepared:

Sample 1: The above liquid prepolymer to which no additive was added.

Sample 2: The above liquid prepolymer 100 parts of which was homogeneously mixed with 3 parts of "Aerosil" (Trade Mark, same as specified in Example 1).

Sample 3: The above liquid prepolymer 100 parts of which was homogeneously mixed with 0.3 part of polyethylene glycol of 6,000 average molecular weight.

Sample 4: The above liquid prepolymer 100 parts of which was homogeneously mixed with 3 parts of "Aerosil" (Trade Mark) and 0.3 part of polyethylene glycol of 6,000 average molecular weight.

The viscosities of the above for samples were measured under 2 r.p.m. and 20 r.p.m. at 23° C. by Brookfield H-type Viscometer with the following results shown in the Table below:

| | Viscosity at 23° C. (cps.) | | Ratio of viscosity of 2 r.p.m. to that of 4 r.p.m. |
|---|---|---|---|
| | 2 r.p.m. | 20 r.p.m. | |
| Sample No.: | | | |
| 1 | 9,850 | 9,880 | 0.997 |
| 2 | 27,200 | 27,000 | 1.00 |
| 3 | 12,000 | 12,200 | 0.984 |
| 4 | 187,000 | 43,500 | 4.50 |

To 2,000 parts of polypropylenediol of average molecular weight of 2,000 were added 278.4 parts of 2,4-trilenediisocyanate and 69.6 parts of 2,6-trilenediisocyanate, and the mixture was heated at 80° C. for 8 hours in nitrogen stream, whereby a colorless and transparent polyurethane prepolymer of amine equivalent of 1,195 was obtained. To 100 parts of the resultant prepolymer were added "Aerosil" (Trade Mark, colloidal silica of 5 to 40 m$\mu$ average particle size manufactured by Degussa, West Germany) and polyethylene glycol of average molecular weight of 1,000 in various amounts shown in the table below, and the mixture was kneaded at 80° C. under vacuum to produce polyurethane compositions.

The viscosities of the compositions thus obtained are listed below:

| | Polyethylene glycol (weight parts) | Viscosities at 23° C. (c.p.s.) | |
|---|---|---|---|
| | | 2 r.p.m. | 20 p.r.m. |
| Aerosil (weight parts): | | | |
| 0 | 0 | 9,650 | 9,700 |
| 3 | 0 | 20,500 | 20,800 |
| 5 | 0 | 24,500 | 24,300 |
| 10 | 0 | 38,200 | 39,000 |
| 30 | 0 | 87,000 | 88,000 |
| 0 | 0.5 | 12,000 | 11,800 |
| 0 | 2 | 17,500 | 17,100 |
| 0 | 10 | 35,500 | 35,800 |
| 3 | 0.01 | 34,000 | 34,000 |
| 3 | 0.3 | 420,000 | 113,000 |
| 3 | 1.0 | 515,000 | 130,000 |
| 5 | 0.01 | 56,000 | 56,000 |
| 5 | 0.3 | 745,000 | 168,000 |
| 5 | 1.0 | >2,000,000 | 1,323,000 |
| 10 | 0.01 | 43,200 | 44,000 |

It should be understood that the invention is not confined to the specific embodiments disclosed above but includes all modifications not departing from the scope of the invention and falling within the scope of the appended claims.

What we claim is:

1. A thixotropic polyurethane composition comprising 100 weight parts of a polyurethane prepolymer having a molecular weight of about 500 to 10,000, 0.5 to 20 weight parts of colloidal silica of an average particle size of 3 to 50 m$\mu$ and 0.05 to 10 weight parts of at least one ethylene glycol polymer, having an average molecular weight of 100 to 20,000, of the group consisting of polyethylene glycol, polyethylene glycol ether and polyethylene glycol ester; the weight ratio of said ethylene glycol polymer to said colloidal silica being in the range of between 0.05:1 and 0.05:1.

2. The thixotropical polyurethane composition according to claim 1, in which said colloidal silica has an average particle size of 5 to 40 m$\mu$.

3. The thixotropical polyurethane composition according to claim 1, in which said weight of the polyethylene glycol polymer to the colloidal silica is in the range of between 0.1:1 and 0.3:1.

4. The thixotropic polyurethane composition according to claim 2, wherein said prepolymer is terminated with NCO groups.

5. The thixotropic polyurethane composition according to claim 2, in which said colloidal silica is contained in the range of 0.5 to 20 weight parts, based on 100 weight parts of the polyurethane prepolymer.

6. The thixotropic polyurethane composition according to claim 1, in which said colloidal silica is contained in the range of 0.5 to 20 weight parts and said ethylene glycol polymer is contained in the range of 0.05 to 10 weight parts, based on 100 weight parts of the polyurethane prepolymer.

7. The thixotropic polyurethane composition according to claim 1, in which said colloidal silica is contained in the range of 3 to 5 weight parts and said ethylene glycol polymer is contained in the range of 0.01 to 1 weight part, based on 100 weight parts of the polyurethane prepolymer.

UNITED STATES PATENT OFFICE
CERTIFICATE OF CORRECTION

Patent No. 3,607,822      Dated September 21, 1971

Inventor(s) Kenichi Nishino

It is certified that error appears in the above-identified patent and that said Letters Patent are hereby corrected as shown below:

Claim 1, last line, change "0.05:1 and 0.05:1" to read ... 0.05:1 and 0.5:1 ...

Claim 3, second line, after "weight" insert ...ratio...

Signed and sealed this 8th day of August 1972.

(SEAL)
Attest:

EDWARD M. FLETCHER, JR.      ROBERT GOTTSCHALK
Attesting Officer      Commissioner of Patents